United States Patent [19]

Hedrick

[11] Patent Number: 5,290,139
[45] Date of Patent: Mar. 1, 1994

[54] PORTABLE HOPPER WITH INTERNAL BRACING

[75] Inventor: Thomas W. Hedrick, Sikeston, Mo.

[73] Assignee: Hedrick Concrete Products Corp., Sikeston, Mo.

[21] Appl. No.: 890,684

[22] Filed: May 29, 1992

[51] Int. Cl.$^5$ .................................................. B60P 1/64
[52] U.S. Cl. ...................................... 414/498; 220/1.5; 414/608
[58] Field of Search ............... 414/498, 607, 608, 347; 298/24–35 M; 105/247, 248; 220/1.5, 562

[56] References Cited

U.S. PATENT DOCUMENTS

| | | | |
|---|---|---|---|
| 2,060,130 | 11/1936 | Scott | 298/30 |
| 2,670,866 | 3/1954 | Glesby | 414/608 |
| 2,685,398 | 8/1954 | King | 220/1.5 X |
| 3,083,879 | 4/1963 | Coleman | 222/143 |
| 3,270,921 | 9/1966 | Nadolske et al. | 222/132 |
| 3,315,616 | 4/1967 | Beaver et al. | 105/248 |
| 3,318,473 | 5/1967 | Jones et al. | 414/608 |
| 3,474,935 | 10/1969 | McKinney et al. | 414/498 X |
| 3,710,966 | 1/1973 | Vaitys | 414/498 |
| 3,918,604 | 11/1975 | Kerster | 105/248 X |
| 4,003,301 | 1/1977 | Norton | 105/248 X |
| 4,138,163 | 2/1979 | Calvert et al. | 220/1.5 X |
| 4,598,925 | 7/1986 | Riggin | 414/498 X |
| 4,893,736 | 1/1990 | Naig | 105/247 X |

FOREIGN PATENT DOCUMENTS

| | | | |
|---|---|---|---|
| 1313906 | 11/1962 | France | 105/248 |
| 616771 | 2/1961 | Italy | 414/498 |

Primary Examiner—David A. Bucci
Attorney, Agent, or Firm—Kolisch Hartwell Dickinson McCormack & Heuser

[57] ABSTRACT

A lightweight, small portable hopper for bulk materials that is removably mountable on a tractor trailer is disclosed. Such trailer includes a trailer bed that is formed with a central opening, and the hopper is usable on it while also leaving space for transporting other items. The hopper includes an upright body with an inner surface that includes plural regions defining a bulk-material storage space. The body also includes a generally downwardly converging section that is supportably positionable on the trailer bed through the central opening, with a subsection terminating with a dispensing port. Also included is internal bracing structure attached to generally opposing regions of the inner surface of the body, and extending across the bulk-material storage space to promote self-supportability of the hopper when it is loaded. The internal bracing structure may include plural, laterally spaced, horizontally-positioned first braces attached to corresponding, generally opposing regions of the inner surface. Also, the internal bracing structure may include plural, laterally spaced, upwardly extending, opposing pairs of second braces that are attached to internal, upwardly extending surfaces of the body, with desired pairs being interconnected by a corresponding first brace. Also disclosed is stop structure positioned across the bulk-material storage space to block a bulk-material loader bucket from extending down and in through the open top of the body and against the inner surface of the hopper while loading bulk material into it. The hopper has an open top and a tarp rack for holding a tarp that is positionable over the top to protect the load from inclement weather conditions.

7 Claims, 3 Drawing Sheets

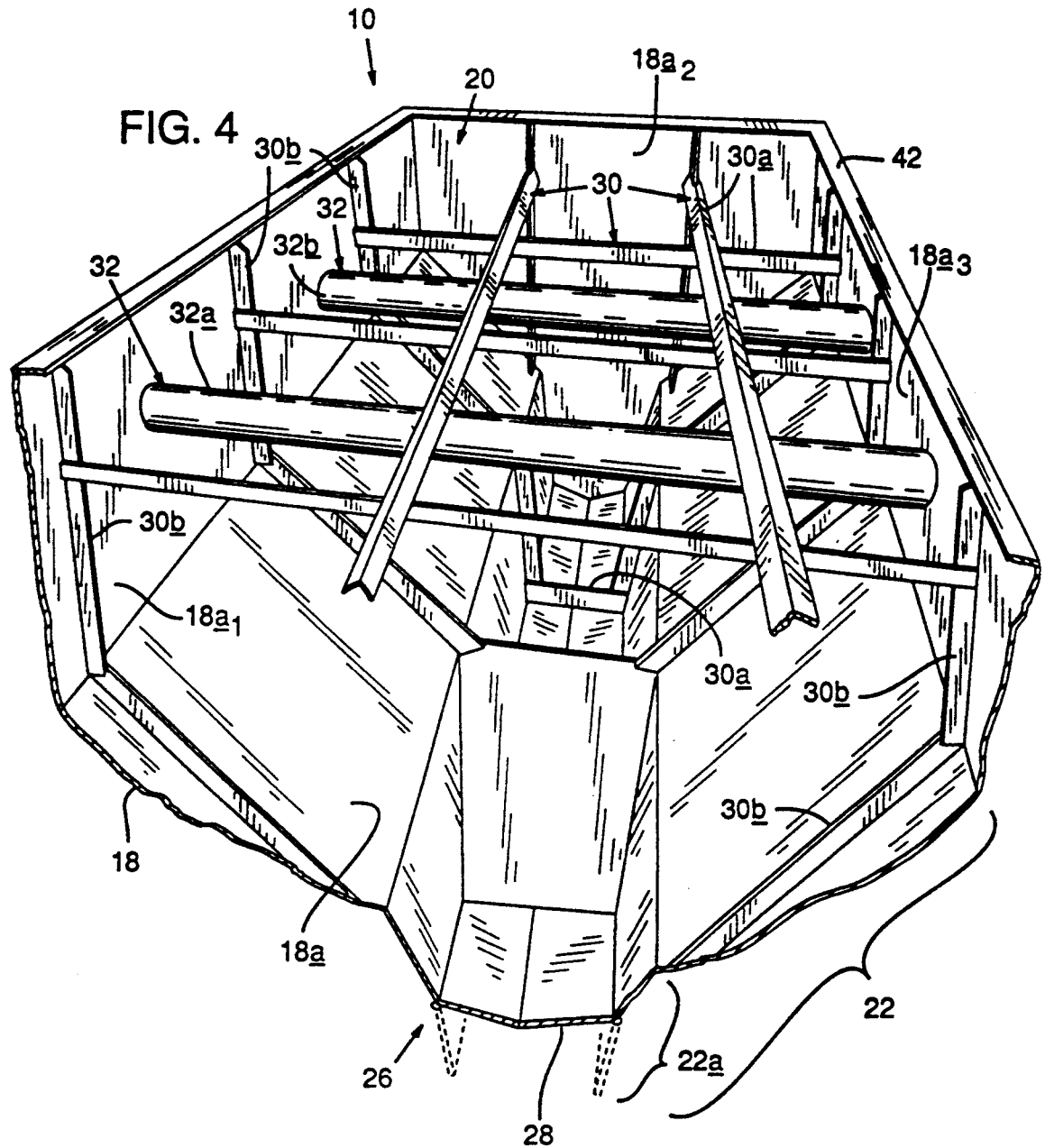

PORTABLE HOPPER WITH INTERNAL BRACING

BACKGROUND OF THE INVENTION

The present invention relates to bins for holding bulk materials, and more particularly to a portable hopper for bulk materials with internal bracing for removably mounting on a tractor trailer.

Conventional portable bins for holding/dispensing bulk materials are heavy, relatively large, relatively tall, unbraced structures. The heavy, large size of such bins is required to adequately support a loaded condition when they contain bulk material such as rock, sand or gravel. Certain of the bins are mountable on truck trailers but, due to their large size, they limit use of the trailer to transporting solely the bins, i.e. there is no room for carrying additional material.

Recently, the American Association of Highway and Transportation Engineers set certain vehicle specifications that require tractor/truck trailer beds to be about 45 feet in length for loads of approximately 80,000 lbs. The old specification required trailers to be about 32 feet in length. For certain shipping operations, it is the required additional 13 feet of length is not needed. One example of these operations is when dense/palletized product is shipped. The approximate 80,000 lb. load limit can easily be contained within about a 25–32 foot section of the newly required 45 foot long trailer.

Suppliers of bagged cement and other dense products are faced with the problem of what to do with the extra space on the trailer. One possible solution would be to place an empty portable hopper for bulk materials on the trailer. The idea is to fronthaul finished product with a lightweight portable hopper, and then backhaul the hopper loaded with bulk materials that are used as raw material for the bagged cement supplier.

Conventional bins do not provide the solution because they are constructed with large dimensions and heavy materials to meet other requirements such as being able to support the weight of a load of bulk material. The net effect is that conventional bins will not fit in the extra space on the new 45 foot trailers. An example of just such a bin is shown in U.S. Pat. No. 4,138,163 to Calvert et al. which shows a large, heavy bin that covers substantially the entire truck trailer. Calvert et al. shows non-intersecting, unconnected endwall, sidewall and roof stiffeners that are designed to add a flexural capability to the bin. Calvert et al. also shows a relatively heavy container because it states that the stiffeners are spaced apart to provide for a thicker container that will be rupture resistant.

Another representative, conventional, truck trailer-mounted bin is shown in U.S. Pat. No. 3,270,921 to Nadolske et al. Nadolske et al. shows a system for mounting several bins with bulk material on a trailer for dispensing the material downwardly through an opening in the trailer. Nadolske et al. shows a system designed specifically for multiple bins each with supporting legs and a bottom discharge outlet mounted on a semi-trailer and positionable over one of plural spouts formed in the trailer frame. To dispense material from a bin, its bottom discharge outlet must be aligned with a spout, a valve must be opened, and a complex feeder-unloader unit must be moved along a track system built into the trailer frame until it communicates with the spout. Nadolske et al. does not address the problem of structuring a single, lightweight portable hopper for the extra space on new 45 foot trailers.

Other conventional portable bins are designed for handling by forklifts by including channels formed in corresponding bottom sections solely for receiving forklift tines. Examples of such bins are shown in U.S. Pat. Nos. 2,685,398 to King, 3,083,879 to Coleman, and 3,318,473 to Jones et al.

Nowhere in the prior art is there shown or suggested to construct a portable container for bulk materials so that it may be sized small relative to a trailer bed, and therefore able to provide room for carrying other items on the trailer in addition to the loaded container itself.

Also, nowhere in the prior art is there shown or suggested to form channels in such portable containers for handling by forklifts, with such channels formed by pipes or tubes that are positioned across the inside of the hopper for reinforcing it, and for providing stop structure to block the bucket of a front end loader from extending down and in against the inside surface of the wall of the hopper while loading of the container with bulk material.

Accordingly, it is a general object of the present invention to provide a portable container for bulk materials that overcomes the drawbacks of prior art bins.

Another object is to provide such a container for removably mounting to a truck trailer, and being constructed to be sized small enough relative to the trailer bed so that other items may be co-transported with it.

Yet another object of the invention is to provide such container that is suitably lightweight for allowing removal from the truck trailer when empty via a forklift.

Another object is to provide such container with an open top for loading bulk material into it using a conventional quarry loader with bucket, and with stop structure to block the bucket of the loader from extending down and in against the inside surface of the hopper while loading bulk material.

Yet another object of the invention is to provide such container with an open top for loading bulk material into it using a conventional loader with bucket, and a rack for storing a tarp that may be positioned over the open top when a load is being transported under inclement weather conditions.

An additional object is to provide such container for removably mounting on a truck trailer that is constructed to be suitably short for allowing loading of bulk material into it through its open top by conventional quarry loaders.

SUMMARY OF THE INVENTION

The present invention achieves the above objects by providing a lightweight, small portable hopper for bulk materials that is removably mountable on a tractor trailer. The trailer has a trailer bed that is formed with a central opening, and the hopper of the present invention is usable on such trailer while also providing space on the trailer bed for transporting other items. The hopper includes an upright body with an inner surface that includes plural regions defining a bulk-material storage space, and includes a generally downwardly converging section that is supportably positionable on such trailer bed through such central opening. The downwardly converging section terminates with a dispensing port.

The invention also includes internal bracing structure attached to generally opposing regions, and extending across the bulk-material storage space to promote self-supportability of the hopper when it is loaded with such bulk materials. The internal bracing structure may include plural laterally spaced first braces attached to corresponding, generally opposing regions. The first braces may be positioned horizontally, and may be positioned both transversely and longitudinally of the body. Also, the internal bracing structure may include plural, laterally spaced, upwardly extending, opposing pairs of second braces that are attached to internal, upwardly extending surfaces of the body, with desired pairs being interconnected by a corresponding first brace.

The hopper of the present invention is also preferably formed with an open top for loading of bulk material into it by a loader with bucket. The internal bracing also includes stop structure that is spaced laterally across the bulk-material storage space from opposing regions of the inner surface, and positioned at a preselected height in the body to block such bucket from extending down and in against the inner surface while loading bulk material into it.

The stop structure preferably takes the form of dual, laterally spaced hollow braces that extend through the body to receive lifters of a lifting device that are positionable in the hollow braces to raise the hopper from the trailer when the hopper is empty.

The hopper of the present invention also includes an outer surface with a rack that extends outwardly from it near the top for holding a tarp used to cover the top when the hopper is loaded and it is desired to protect the load from inclement weather conditions.

These and additional objects and advantages of the present invention will be more readily understood after a consideration of the drawings and the detailed description of the preferred embodiment.

BRIEF DESCRIPTION OF THE DRAWINGS

FIG. 4 is an enlarged fragmentary, perspective view from above the hopper shown in FIG. 1 with certain portions of it not shown, and without showing the tractor trailer.

DETAILED DESCRIPTION OF THE PREFERRED EMBODIMENT

Figure 1:
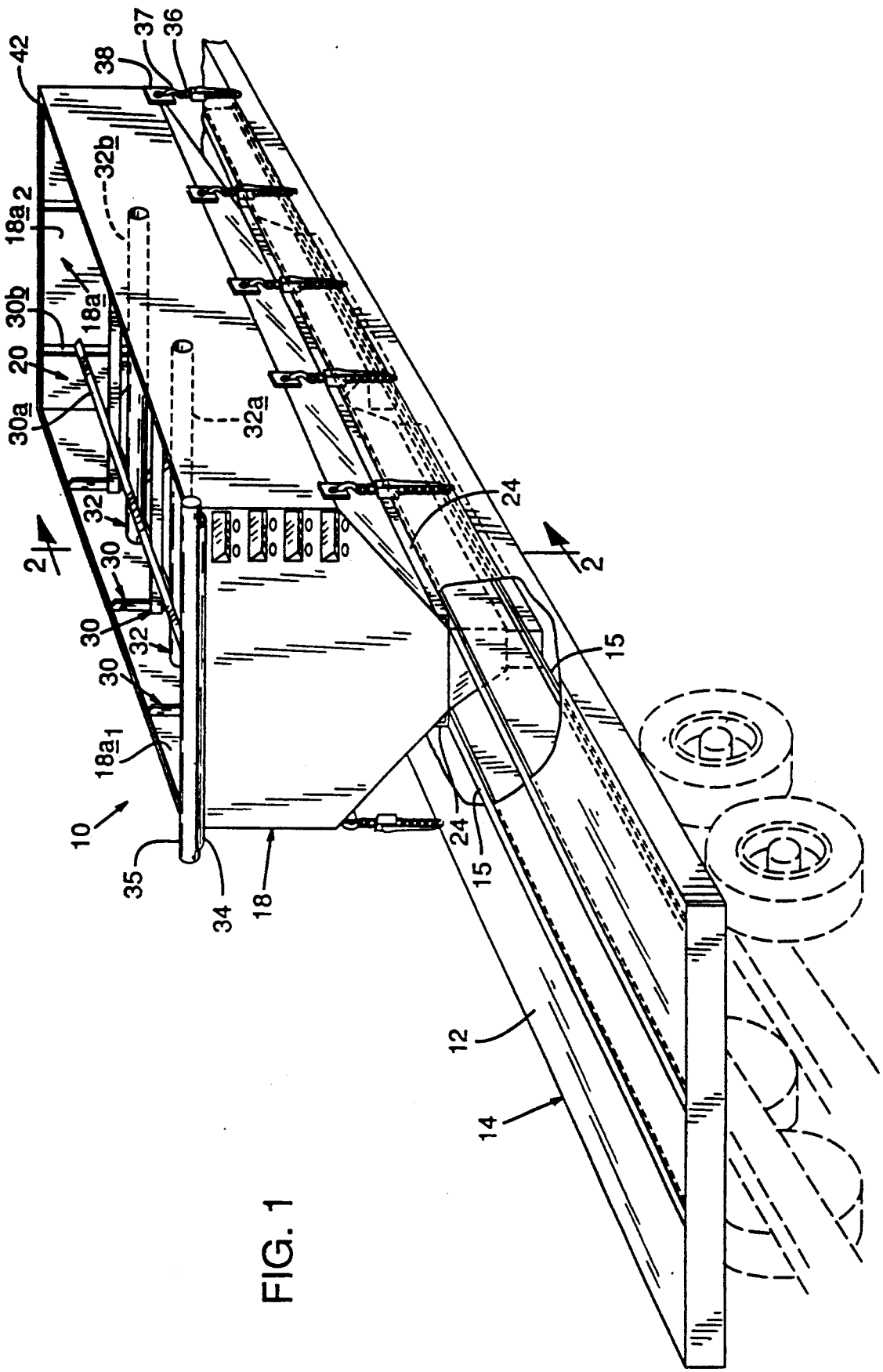
FIG. 1 is a perspective view of the portable hopper of the present invention being removably mounted on a tractor trailer, the latter being shown fragmentarily.

Turning to the drawings, the preferred embodiment of the portable hopper of the present invention is shown at 10 in FIG. 1 being removably mounted on trailer bed 12 of tractor trailer 14. A suitable tractor trailer may be obtained from the Transcraft company. As required by state and federal regulations, the trailer is about 45–50 feet long so it can carry about 80,000 lb. loads. To use the trailer with the present invention, two modifications need be made to it. First, a central opening is formed in bed 12 corresponding to the dimensions of that portion of hopper 10 which is positioned through the bed as shown in FIG. 1. The bed is commonly made of wood and the opening may be formed by cutting the wood.

Second, two diaphragm members (undepicted) should be positioned transversely of the trailer bed to relieve stress concentrations focused at the trailer bed adjacent the front and rear of hopper 10. The stress concentrations are caused by the placement of the hopper on the trailer and through the opening. By placing the hopper in that position, the trailer is made more rigid along that portion of its length that corresponds to the hopper. By adding the usual diaphragm members known to trailer manufacturers, the trailer receives increased torsional bracing and the stress concentration caused by the hopper placement is greatly minimized if not removed. One diaphragm member should be positioned in the trailer bed adjacent the front of hopper 10 and the other diaphragm member should be placed in the bed adjacent the rear of the hopper. Common forms of such diaphragm members are X-shaped braces that are attached to the underside of the trailer by welding.

Referring to FIG. 1, the trailer used with the present invention should also be of the type that includes dual parallel I-beams 15 that run longitudinally of it forming part of trailer bed 12 and generally supporting the bed for its load-bearing function. Those familiar with tractor trailers know that they include triangularly shaped flange braces 16 (FIG. 2) extending from outer surfaces of the I-beams to undersurfaces of trailer bed 12 to further support the bed. The flange braces are usually welded in place. Like the flange braces, the above-described X-shaped diaphragm members are positioned and then welded to the I-beams and underside of trailer bed 12 at desired places.

Figure 2:
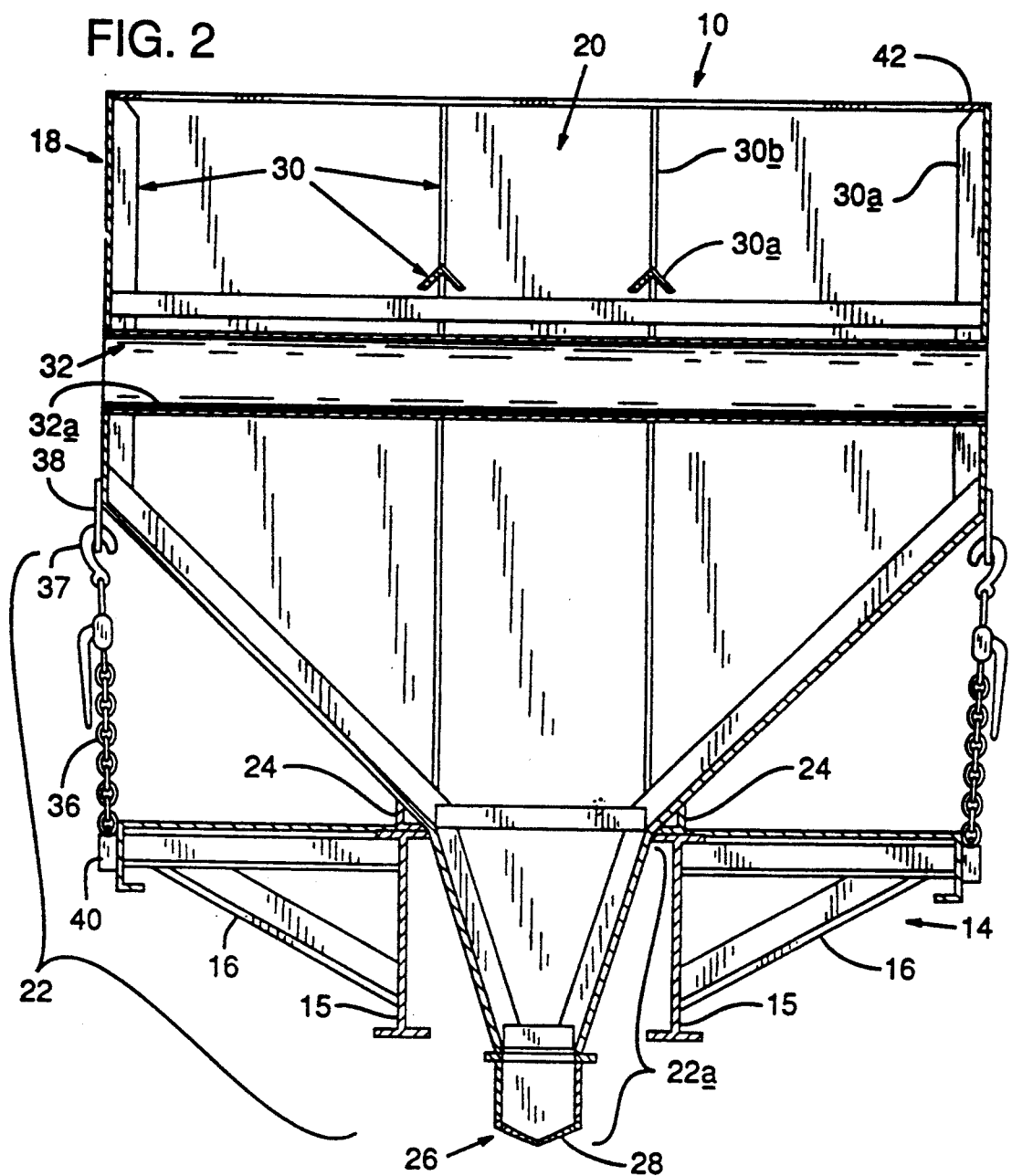
FIG. 2 is a front elevational sectional view through line 2—2 of FIG. 1.

Still referring to FIGS. 1–2, hopper 10 preferably extends about 7 feet above trailer bed 12, is 8 feet wide, and is preferably about 12–20 feet long, for reasons to be described. Also, because hopper 10 includes to-be-described internal bracing structure, it can be fabricated from suitable sheet metal of about 11–15 gauge so that its overall weight is approximately 2,000–3,000 lbs, which weight is substantially lighter than large, heavy, unbraced conventional hoppers for bulk materials. The hopper is preferably made from metal, although other suitable materials may be used, and welding or other suitable assembly methods may be used to attach the various pieces of sheet metal that form the hopper.

Referring to FIGS. 1–2, and 4, details of hopper 10 will now be discussed. The hopper includes an upright body 18 with an inner surface 18a that includes plural regions such as $18a_1$–$a_3$ defining a bulk-material storage space 20. Hopper 10 also includes a generally downwardly converging section, shown by bracket 22 in FIG. 4, that is supportably positionable on trailer bed 12. Preferably, the downwardly converging section is equipped with support structure 24 which may take the form of mounting brackets made from angle iron or other suitable materials. Shock/vibration absorbers (undepicted) may also be sandwiched between the bottoms of brackets 24 and the tops of I-beams 15 to further stabilize the hopper on the trailer, and to minimize the tendency for the hopper to move upwardly out of the central opening in the trailer bed during travel.

As shown best in FIG. 2, a subsection 22a of section 22 extends through the central opening in trailer bed 12, and terminates with a dispensing port 26. To regulate dispensing of bulk material from port 26, a hinged gate 28 is provided. Conventional clam gates or other conventional gates may be used as gate 28 to ensure that bulk material does not exit body 18 when the gate is closed.

Figure 3:
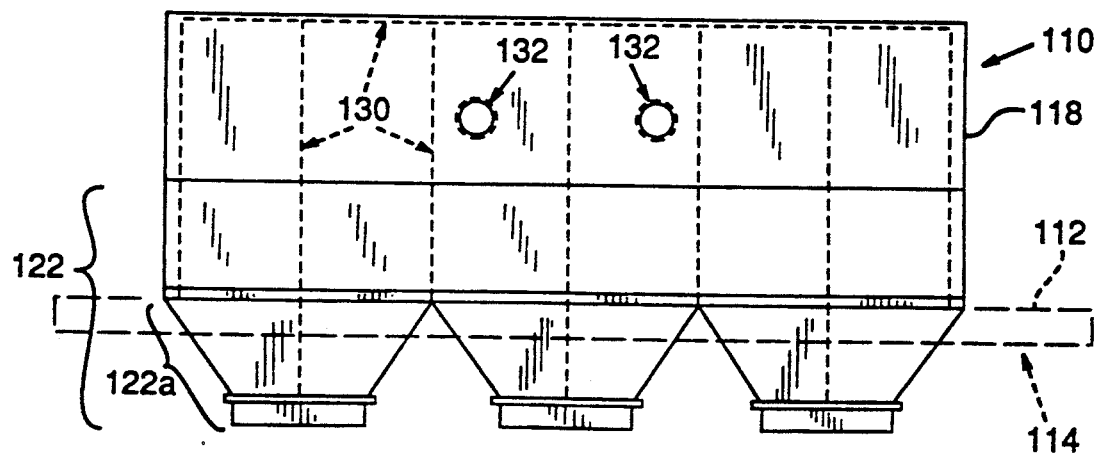
FIG. 3 is a side elevational view of another embodiment of the present invention.

Referring to FIGS. 2 and 3, subsection 22a,122a may be formed as two or three subhoppers for dispensing bulk material out of corresponding dual, or triple dispensing ports 26,126. It should be understood that any number of subhoppers could be provided in the subsection, including having a single subhopper.

Still referring to FIGS. 1–2, and 4, internal bracing structure 30 (also referred to as space truss structure) is attached to generally opposing regions (e.g. regions $18a_1$ and $18a_3$) of inner surface 18a, and extends across bulk-material storage space 20. As will be described, bracing structure 30 promotes self-supportability of the hopper when it is loaded with bulk materials such as sand or gravel.

Referring to FIG. 4, bracing structure 30 includes plural laterally spaced first braces 30a attached to corresponding, generally opposing regions such as regions $18a_1$ and $18a_3$. The first braces are preferably positioned horizontally. The bracing structure also includes plural, laterally spaced, upwardly extending, opposing pairs of second braces 30b that are attached to internal, upwardly extending regions of inner surface 18a such as regions $18a_1$ and $18a_3$. Desired pairs of second braces 30b are interconnected by corresponding first braces 30a. The first braces are preferably positioned transversely and longitudinally of body 18. The first and second braces are attached as by welding or other suitable means, and may be formed of flat or angled plates. Referring to FIG. 4, the topmost first braces are angled to allow bulk material being dispensed into space 20 to roll off the them.

With the corresponding ones of the first and second braces attached as shown best in FIG. 4, bracing structure 30 is attached to inner surface 18a in an interconnected fashion for reasons to be described.

Still referring to FIG. 4, hopper 10 is formed with an open top for loading of bulk material into it by a quarry loader with bucket. The hopper also includes stop structure 32 that is spaced laterally across bulk-material storage space 20 from opposing regions such as $8a_1$ and $18a_3$. Stop structure 32 is preferably positioned at a preselected height near the top of body 18 for reasons to be described. Preferably, stop structure 32 takes the form of dual, laterally spaced hollow braces such as 5-inch diameter pipes 32a-b that extend through the body, as shown best in FIGS. 1 and 3 to receive lifters (undepicted) of a lifting device (undepicted) that are positionable in the braces to raise the hopper from the trailer when the hopper is empty. For example a forklift with forklift tines may be used as the lifting device and lifters, respectively.

Referring back to FIG. 1, outer surface 18b of body 18 is also equipped with a rack 34 that extends outwardly from it near the top for holding a tarp 35 provided on a roll. The roll may be suitably attached to the rack with fasteners (undepicted) to allow unraveling of the tarp over the open top of hopper 10 to cover it when the hopper is loaded, and it is desired to protect the load from inclement weather conditions.

Still referring to FIG. 1, hopper 10 is further stabilized on trailer bed 12 with tie-down chains 36 that are each attached via hooks 37 to corresponding plates 38 fixedly attached to body 18, and attached (or looped through) brackets that extend outward of trailer bed 12 such as brackets 40 shown in FIG. 2. A come-along or other suitable tightener may be used to tighten the chains for stabilizing the hopper relative to the trailer. The hopper should also be formed with a top protective rim 42 to protect the sides of body 18 from the bucket of a quarry loader when bulk material is dumped into bulk-material storage space 20.

Operation

Referring to FIG. 1, hopper 10 is removably mountable on trailer bed 12 with subsection 22a of downwardly converging section 22 fittable through a corresponding opening in the trailer bed. Support structure 24 such as mounting brackets allow the hopper to rest against the tops of I-beams 15 in an upright position. Tie-down chains 36 further stabilize the hopper in its upright position for eventual transport in a loaded condition with bulk material.

Referring to FIGS. 1 and 4, internal bracing structure 30 provides necessary strengthening of the hopper so that the latter can be made with the above-identified lightweight metal sheets and yet be able to support itself under the weight of a load of bulk material. The open top of hopper 10 and its relatively short dimension (e.g. about 7 feet above the trailer bed 12) allows the hopper to be loaded with bulk material using a conventional loader with bucket. Stop structure 30, such as 5-inch diameter pipes, form part of the internal bracing structure, and also block the bucket (undepicted) of a loader used to fill body 18 with bulk material from undesirably extending down and in against inner surface 18a of the hopper during loading operations, which extension might cause damage to the hopper.

Referring to FIG. 1, rack 34 of body 18 holds a tarp 35 provided on a roll. The roll may be used to unravel the tarp over the open top of hopper 10 to cover it when the hopper is loaded and it is desired to protect the load from inclement weather conditions.

It should now be understood that hopper 10 provides a portable container for bulk materials that overcomes the drawbacks of prior art bins. The hopper of the present invention is removably mountable on truck trailer 14, and is constructed to be sized small enough relative to the trailer bed so that other items may be co-transported with such container. For example, hopper 10 can be used on trailer 14 to allow for fronthauling finished products and backhauling raw materials. That is, the approximate 12–20 foot length of the hopper allows an additional 25–33 feet for shipping finished product such as dense/palletized product. Commercially desirable quantities of the dense/palletized product, such as bagged cement, can be positioned easily within the remaining space on the trailer bed. Further, the hopper is suitably lightweight for allowing removal from the truck trailer when empty via a forklift by positioning the forklift tines in hollow brace/pipes 32a,b.

While the present invention has been shown and described with reference to the foregoing preferred embodiment, it will be apparent to those skilled in the art that other changes in form and detail may be made therein without departing from the spirit and scope of the invention as defined in the appended claims.

What is claimed is:

1. A lightweight, small portable hopper for bulk materials that is removably mountable on a tractor trailer with a trailer bed that is formed with a central opening, and usable on the trailer while also providing space on the trailer bed for transporting other items, comprising:

an upright body with an inner surface that includes plural regions defining a bulk-material storage space, and including a generally downwardly converging section that is supportably positionable on such trailer bed with a subsection of the downwardly converging section extending through the central opening, and with the subsection terminating with a dispensing port; and internal bracing structure attached to generally opposing regions and extending across the bulk-material storage space to promote self-supportability of the hopper when it is loaded with such bulk materials;

wherein the body is formed with an open top for loading of bulk material into the hopper by a loader with bucket;

wherein the internal bracing structure includes a stop structure that is spaced laterally across the bulk-material storage space from generally opposing regions of the inner surface, and positioned at a preselected height in the body to block such bucket from extending down and in against the inner surface of the hopper while loading bulk material into the hopper; and wherein the stop structure takes the form of dual, laterally spaced hollow braces that extend through the body to receive lifters of a lifting device that are positionable in the hollow braces to raise the hopper from the trailer when the hopper is empty.

2. A lightweight, small portable hopper for bulk materials that is removably mountable on a tractor trailer with a trailer bed that is formed with a central opening, and usable on the trailer while also providing space on the trailer bed for transporting other items, comprising:

an upright body with an inner surface that includes plural regions defining a bulk-material storage space, and including a generally downwardly converging section that is supportably positionable on such trailer bed with a subsection of the downwardly converging section extending through the central opening, and with the subsection terminating with a dispensing port; and internal bracing structure attached to generally opposing regions and extending across the bulk-material storage space to promote self-supportability of the hopper when the hopper is loaded with such bulk materials;

wherein the internal bracing structure includes plural laterally spaced first braces attached to corresponding, generally opposing regions of the inner surface;

wherein the first braces are positioned horizontally;

wherein the internal bracing structure includes plural, laterally spaced, upwardly extending, opposing pairs of second braces that are attached to internal, upwardly extending surfaces of the body, with desired pairs being interconnected by a corresponding horizontal first brace;

wherein the body has a length and a width, with the length greater than the width, and wherein the first braces are positioned transversely and longitudinally of the body;

wherein the body is formed with an open top for loading of bulk material into the hopper by a loader with bucket;

wherein the internal bracing includes a stop structure that is spaced laterally across the bulk-material storage space from generally opposing regions of the inner surface, and positioned at a preselected height in the body to block such bucket from extending down and in against the inner surface of the hopper while loading bulk material into the hopper; and wherein the stop structure takes the form of dual, laterally spaced hollow braces that extend through the body to receive lifters of a lifting device that are positionable in the hollow braces to raise the hopper from the trailer when the hopper is empty.

3. The hopper of claim 1 or 2 wherein the body also includes an outer surface with a rack that extends outwardly from the body near the top for holding a tarp used to cover the top when the hopper is loaded and it is desired to protect the load from inclement weather conditions.

4. A portable hopper for storing/dispensing bulk materials that is removably mountable on a tractor trailer with a trailer bed that is formed with a central opening, comprising:

an upright body with an inner surface that includes plural regions defining a bulk-material storage space, and including a generally downwardly converging section that is positionable on such trailer bed with a subsection of the downwardly converging section extending through the central opening, and with the subsection terminating with a dispensing port;

support structure associated with the body for removably mounting it on such trailer bed;

internal bracing structure attached to the inner surface in an interconnected fashion to promote self-supportability of the hopper when it is loaded with bulk material;

wherein the body is formed with an open top for loading of bulk material into the hopper by a loader with bucket;

wherein the internal bracing structure includes a stop structure that is spaced laterally across the bulk-material storage space from generally opposing regions of the inner surface, and positioned at a preselected height in the body to block such bucket from extending down and in against the inner surface of the hopper while loading bulk material into the hopper; and wherein the stop structure takes the form of dual, laterally spaced hollow braces that extend through the body to receive lifters of a lifting device that are positionable in the hollow braces to raise the hopper from the trailer when the hopper is empty.

5. A portable hopper for storing/dispensing bulk materials that is removably mountable on a tractor trailer with a trailer bed that is formed with a central opening, comprising:

an upright body with an inner surface that includes plural regions defining a bulk-material storage space, and including a generally downwardly converging section that is positionable on such trailer bed with a subsection of it extending through the central opening, and with the subsection terminating with a dispensing port;

support structure associated with the body for removably mounting it on such trailer bed;

internal bracing structure attached to the inner surface in an interconnected fashion to promote self-supportability of the hopper when it is loaded with bulk material;

wherein the internal bracing structure includes plural laterally spaced first braces attached to corresponding, generally opposing regions of the inner surface;

wherein the first braces are positioned horizontally;

wherein the internal bracing structure includes plural, laterally spaced, upwardly extending, opposing pairs of second braces that are attached to internal, upwardly extending surfaces of the body, with desired pairs being interconnected by a corresponding first brace;

wherein the body has a length and a width, with the length greater than the width;

wherein the first braces are positioned transversely and longitudinally of the body;

wherein the body is formed with an open top for loading of bulk material into the hopper by a loader with bucket;

wherein the internal bracing includes a stop structure that is spaced laterally across the bulk-material storage space from generally opposing regions of the inner surface, and positioned at a preselected height in the body to block such bucket from extending down and in against the inner surface of the hopper while loading bulk material into the hopper; and wherein the stop structure takes the form of dual, laterally spaced hollow braces that extend through the body to receive lifters of a lifting device that are positionable in the hollow braces to raise the hopper from the trailer when the hopper is empty.

6. The hopper of claim 4 or 5 wherein the body also includes an outer surface with a rack that extends outwardly from the hopper near the top for holding a tarp used to cover the top when the hopper is loaded and it is desired to protect the load from inclement weather conditions.

7. A portable hopper for storing/dispensing bulk materials, with the hopper being removably mountable on a tractor trailer with a trailer bed that is formed with a central opening, comprising:

an upright body with an inner surface that includes plural regions defining a bulk-material storage space, and including a generally downwardly converging section that is positionable on such trailer bed with a subsection of the downwardly converging section extending through the central opening, and with the subsection terminating with a dispensing port; and support structure associated with the body wherein the support structure takes the form of dual, laterally spaced hollow braces extend through the body above said downwardly converging section to receive lifters of a lifting device that are positionable in the hollow braces for removably mounting the hopper on such trailer bed.

* * * * *